(12) United States Patent
Hamaker et al.

(10) Patent No.: US 10,065,249 B2
(45) Date of Patent: Sep. 4, 2018

(54) COLLET LOCKING SHAFT ASSEMBLY

(71) Applicant: Bison Gear & Engineering Corp., St. Charles, IL (US)

(72) Inventors: Jeffery A. Hamaker, McHenry, IL (US); Matthew Sherman Hanson, Palatine, IL (US)

(73) Assignee: Bison Gear & Engineering Corp., St. Charles, IL (US)

( * ) Notice: Subject to any disclaimer, the term of this patent is extended or adjusted under 35 U.S.C. 154(b) by 75 days.

(21) Appl. No.: 15/217,261

(22) Filed: Jul. 22, 2016

(65) Prior Publication Data

US 2018/0021745 A1 Jan. 25, 2018

(51) Int. Cl.
*B23B 31/20* (2006.01)
*B01F 7/20* (2006.01)
*B01F 15/00* (2006.01)

(52) U.S. Cl.
CPC .............. *B23B 31/207* (2013.01); *B01F 7/20* (2013.01); *B01F 15/0048* (2013.01); *B23B 31/20* (2013.01); *B23B 2231/2078* (2013.01); *B23B 2231/2083* (2013.01); *Y10T 279/17538* (2015.01)

(58) Field of Classification Search
CPC ....... B23B 31/20; B23B 31/207; B23B 31/26; B23B 31/265; B23B 31/266; B23B 2231/2078; B23B 2231/0228; B23B 2231/0232; B23B 2231/2032; B23B 2231/2035; B23B 2231/2083; B23B 2231/42; Y10T 279/17324; Y10T 279/17427; Y10T 279/17606; Y10T 279/17538; Y10T 279/17529; Y10T 279/17547; B01F 15/0048; B01F 7/20
See application file for complete search history.

(56) References Cited

U.S. PATENT DOCUMENTS

| | | | | |
|---|---|---|---|---|
| 4,023,815 A * | 5/1977 | Dunham | ............... | B23B 31/202 279/153 |
| 4,102,035 A * | 7/1978 | Voglrieder | ............ | B23B 31/265 483/18 |
| 4,750,850 A * | 6/1988 | Husted | .................. | B23B 31/207 408/239 R |
| 4,913,605 A * | 4/1990 | Schwartzman | ....... | B23B 31/207 409/231 |
| 5,398,947 A * | 3/1995 | Cook | .................... | B23B 31/202 279/133 |
| 5,431,416 A * | 7/1995 | Thornton | .............. | B23B 31/207 279/143 |
| 5,664,917 A * | 9/1997 | Judy | ...................... | B23Q 5/045 279/53 |
| 2016/0107243 A1* | 4/2016 | Motschi | .................. | B23B 31/20 279/43.1 |

* cited by examiner

*Primary Examiner* — Eric A Gates
*Assistant Examiner* — Chwen-Wei Su
(74) *Attorney, Agent, or Firm* — Garlick & Markison; Timothy W. Markison; Randy W. Lacasse

(57) ABSTRACT

A universal driven shaft retaining system includes a collet chuck holder that circumferentially engages a collet chuck with substantially inward compression during inward co-linear movement of a drawing bar creating a clamping (locking) effect on an inserted driven shaft.

12 Claims, 4 Drawing Sheets

COLLET LOCKING SHAFT ASSEMBLY

BACKGROUND

Technical Field

The present disclosure relates to a method and system for machine mixers. More specifically, it is related to shaft attachment applications.

Description of Related Art

Gearmotors for industrial applications have output shafts with various diameters. Hollow shafts are a popular choice for many applications as they can adapt to customer's machines without couplings. However, some applications need to be disconnected frequently to change sizes (width/length) or for cleaning in-between batches. Often the shaft diameter/shape (e.g., bigger diameter, smaller diameter, longer length, shorter length or non-round cross-section) needed may not match an original manufacturer (OEM) included shaft and therefore coupling mechanisms may not be readily calibrated to accept the various shafts sized outside one originally recommended for the machine.

Disadvantages of conventional approaches will be evident to one skilled in the art when presented in the disclosure that follows.

BRIEF DESCRIPTION OF THE SEVERAL VIEWS OF THE DRAWING(S)

DETAILED DESCRIPTION

Summary

The embodiments of the present disclosure may be practiced in a variety of devices that operate in conjunction with gear motors/motors in an industrial or commercial environment. The examples described herein pertain to devices that can operate within hollow, solid or hybrid shaft specifications and/or designs. However, the embodiments of the present disclosure may be readily adapted to other shaft designs, shapes (cross-sections), sizes (diameters), lengths, materials, standards, industrial applications, and various motorized mixers, etc.

In one embodiment, a collet chuck, such as a 5C collet, in conjunction with a coupling shaft, drawbar and lock nut provide quick changing capabilities while including options for various sized shafts. The collet is flexible in size and can evolve to changing equipment requirements. New applications can therefore be included by customization of the various connectors as will be discussed in greater detail hereafter. These customizations can be made on the fly by selection of a specific collet/shaft combination through an in-field upgrade or through customer-exposed design needs.

Figure 1:
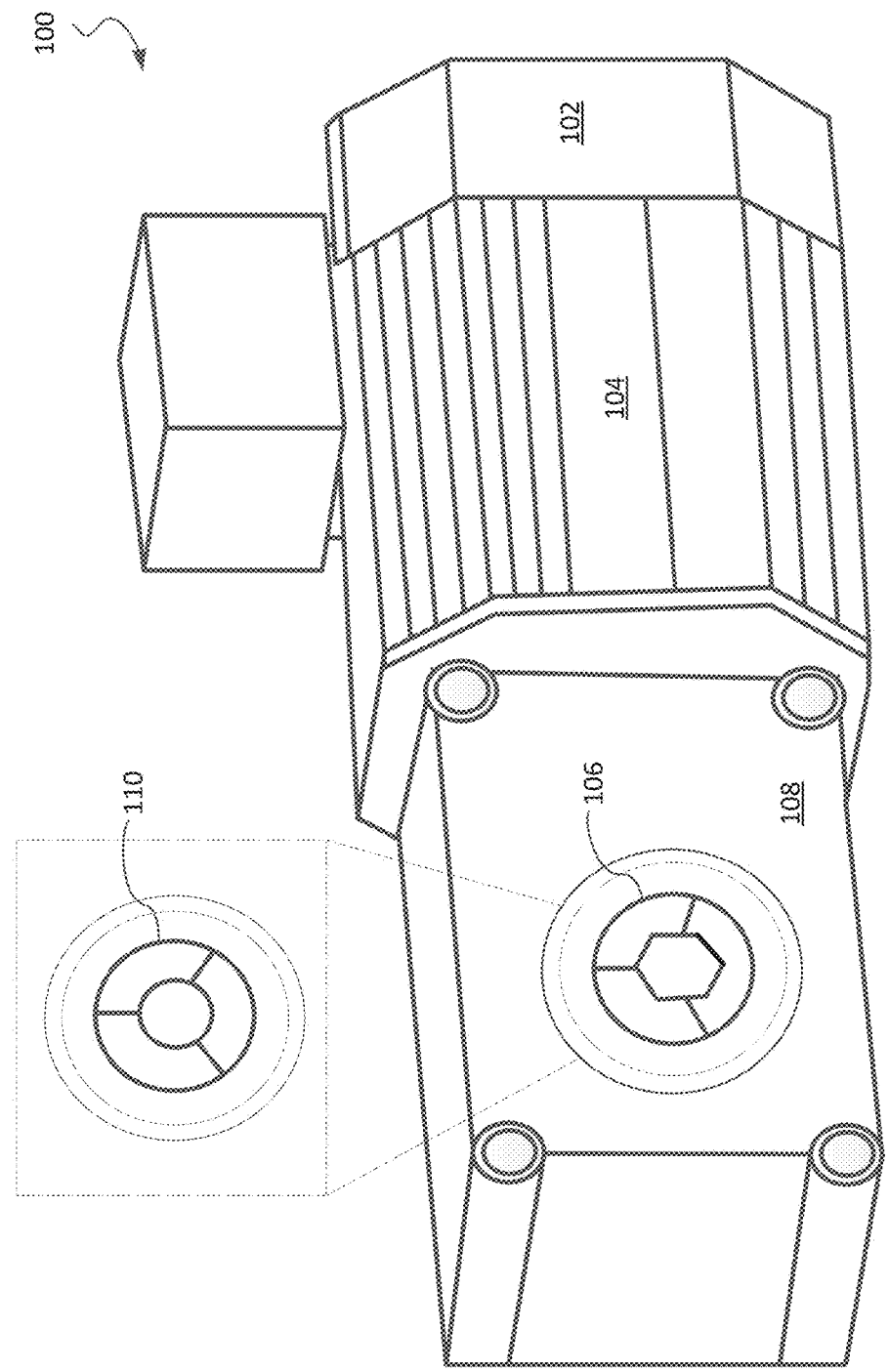
FIG. 1 illustrates a gearmotor environment for practicing an embodiment of the present disclosure.

FIG. 1 illustrates a gearmotor environment 100 for practicing an embodiment of the present disclosure. For example, gearmotor 102 includes motor 104 to turn a shaft (not shown) by translating rotational torque of the motor into rotational movement of the coupling mechanism 106 to the shaft. Coupling mechanism 106 can be of various sizes and shapes. As shown, coupling mechanism 106 includes a hexagonal collet for receiving a hexagonal or square shaft. Alternate embodiment coupling mechanism 110 is illustrated with a round collet opening for receiving round shafts.

A right angle gear motor is shown. The right angle gear motor (i.e., motor shaft not in direct line with work shaft rotation) translates rotation of a motor through a series of gears (encased within case 108) and outputs rotation in a transverse direction (e.g., 90 degrees) as shown. Parallel shaft gear motors are also considered within the scope of the technology as described. A parallel shaft gear motor rotates in axial alignment with a connected shaft.

Figure 2:
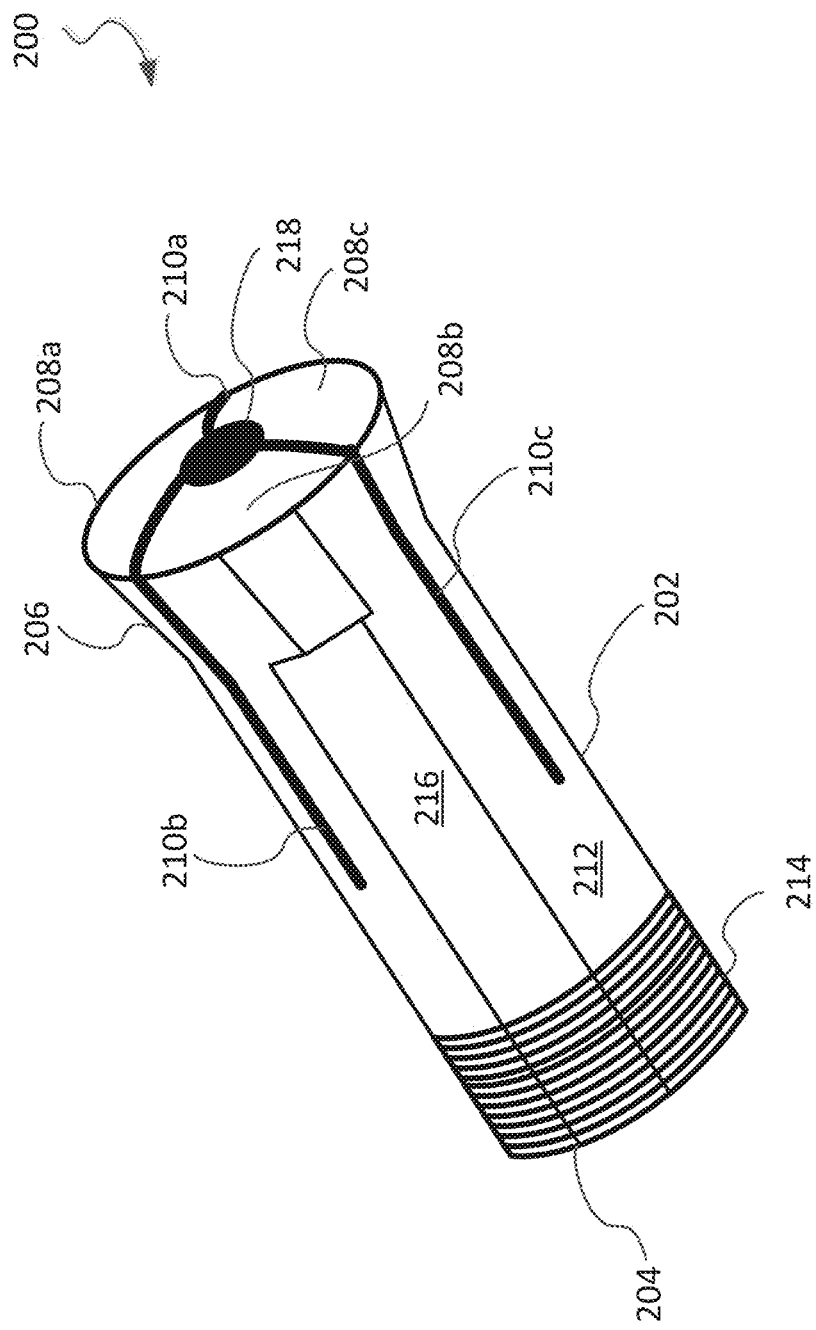
FIG. 2 illustrates an example collet in accordance with the present disclosure.

FIG. 2 illustrates a block diagram of an embodiment of a collet according to the present disclosure. As shown, collet chuck 200 includes a hollow sleeve 202 which terminates at its proximate end in a round, hexagonal or square portion 204 and, at its outer distal end, in an expanded frustoconical portion 206 which is divided into a number (in this case, three) of spring-fingers 208a, 208b and 208c (with interior chucking faces (FIG. 3, e.g., element 309)), separated by slits (210a, 210b and 210c). The spring fingers extend from an annular end or base of the cone into the cylindrical central body portion 212 of the sleeve. Threads 214 upon which a draw bar (FIG. 3, 308) engages are contained on the central body portion 212 of the chuck and adjacent to the round/hexagonal/square end 204 thereof. Optional groove 216 provides for a fixed placement of the collet chuck within a collet chuck holder (see FIG. 3). Shaft receiving opening 218 can be round, square, hexagonal, or custom shaped without departing from the scope of the technology described herein in various embodiments.

One common collet is a 5C style collet (as shown). As previously described, a 5C collet has a short tapered head separated into spring fingers and a narrow body with, for example, three (3) longitudinal slits along the front part of the head and body. In addition, the number of slits or spring-fingers can be changed without departing from the scope of the technology disclosed herein. As will be discussed in further detail below, threaded at one end, a drawbar or other device is threaded onto the 5C collet and the 5C collet is pulled inward into a matching taper of a collet holder. This pulling action closes interior collet chucking faces around an inserted mixing shaft and grips it with adequate force to perform mixing operations.

Figure 3:
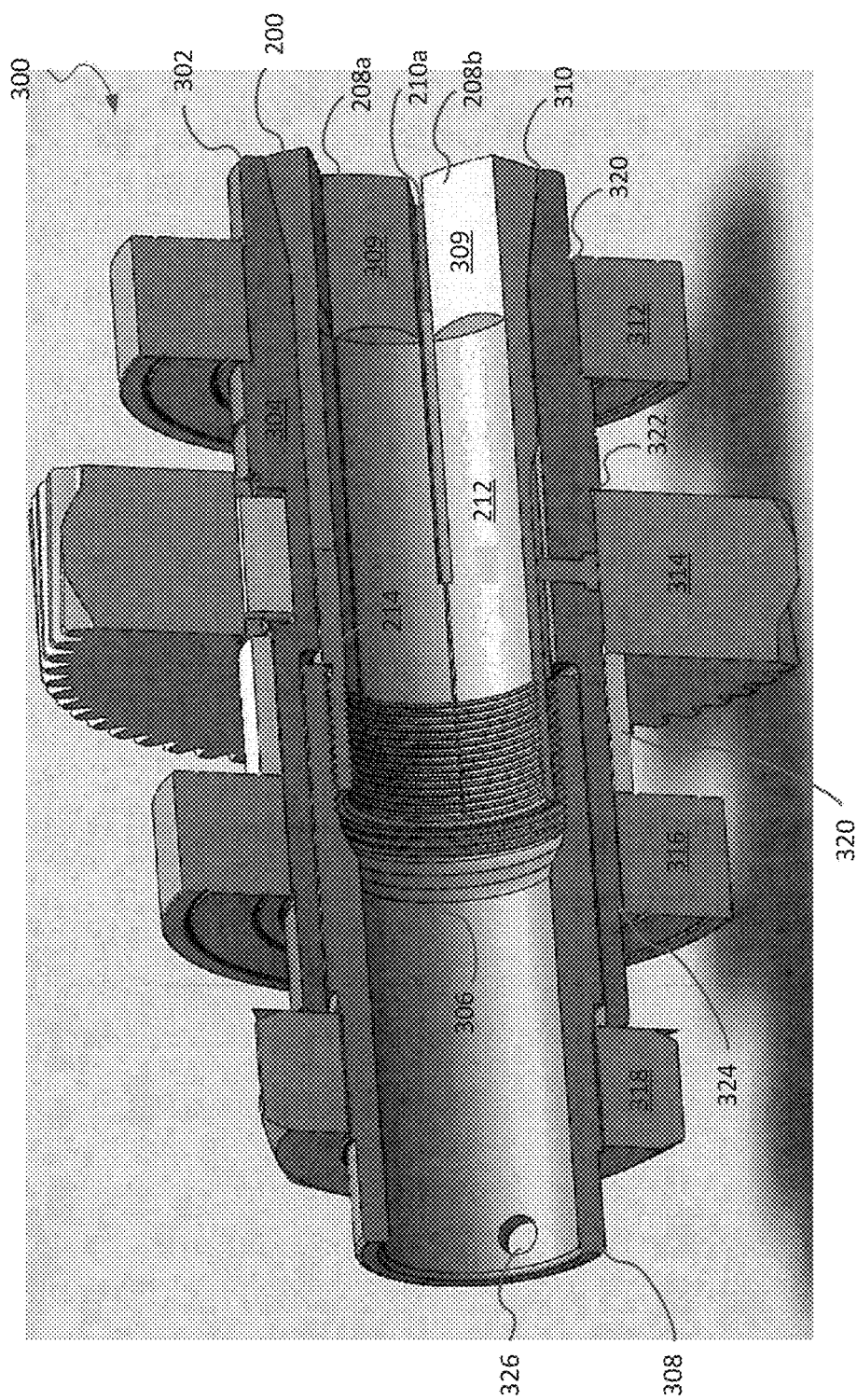
FIG. 3 illustrates a cut-away of an embodiment of use of the collet of FIG. 2 with a retaining system in accordance with the present disclosure.

FIG. 3 illustrates a block diagram of an embodiment of shaft retaining system 300 including collet chuck 200.

Shaft retaining system 300 includes collet chuck holder 302 (outer member) implemented as a sleeve or corresponding shaped collet. Collet chuck holder 302 has a central cylindrical body portion 304 that circumferentially engages collet chuck 200 along a central axis with substantially inward compression during inward co-linear movement creating a clamping effect on spring-fingers 208a, 208b and 208c. More particularly, at a distal interior end portion, collet chuck holder 302 includes wedge shaped engaging mechanisms 310 (chucking faces) to engage exterior surfaces of spring-fingers 208a, 208b and 208c at approximately the same inclination angle. Collet chuck holder 302 can, in one example embodiment, be round, hexagonal or square, or in a second example embodiment, be similar in shape to collet chuck 200. In the second embodiment, like the chuck 202, it would have an expanded frustoconical end portion (not shown), with or without spring fingers.

As further shown in FIG. 3, proximal end threads 214 radially engage proximal internal threads 306 on sleeve 308 (drawing bar). Mated threaded engagement (214/306) produces relative co-linear movement creating the previously described clamping effect on spring-fingers 208a, 208b and 208c by wedge surfaces 310. Co-linear adjustment is created by rotation of hexagonal lock nut 318. Hexagonal lock nut 318 provides longitudinal adjustments during rotation on drawing bar 308 with an abutment force to a proximal end of collet chuck holder 302. Hole 326 may retain a locking pin to secure hexagonal lock nut 318 within the length of drawing bar 308.

Two ball bearings, 316 and 312, provide radial alignment and axial support mechanisms. These bearings, 312 and 316, keep the various sleeves (e.g., collet chuck holder, drawing bar, etc.) of the retaining system in linear alignment during use (e.g., rotation). Gear 314 provides a geared surface for mechanical rotation of the entire shaft retaining system by one or more gears of the gearmotor. Spacer 320 creates a fixed spacing between gear 314 and ball bearing 316 during relative co-linear movement.

The operation of the system or the device is as follows: with collet chuck 200 partially screwed into drawing bar 308, but only part way into collet chuck holder 302, spring-fingers 208a, 208b and 208c are free from any clamping force, hence a mixing shaft may be inserted into the collet chuck. Threaded rotation of collet chuck 200 within drawing bar 308, in a proximate inward direction, causes a clamping effect on spring-fingers 208a, 208b and 208c to nest tightly within the similarly shaped interior end 310 of collet chuck holder 302. This relative inward movement of the collet exerts a compression force upon spring-fingers 208a, 208b and 208c and urges the outer cylindrical surfaces of the spring-fingers into tight engagement with the inner surface of collet chuck holder 302. The same inward movement of collet chuck 200 compresses an inner surface (e.g., chuck 309) of spring-fingers 208a, 208b and 208c causing a clamping force upon a mixing shaft placed there between (before tightening). In order to release the clamping forces applied to the mixing shaft by collet chuck 200, it is merely necessary to unscrew the collet chuck by turning the hexagonal lock nut in the reverse direction, whereupon the collet chuck may be pushed (or pulled) along the mixing shaft to any desired point.

Figure 4:
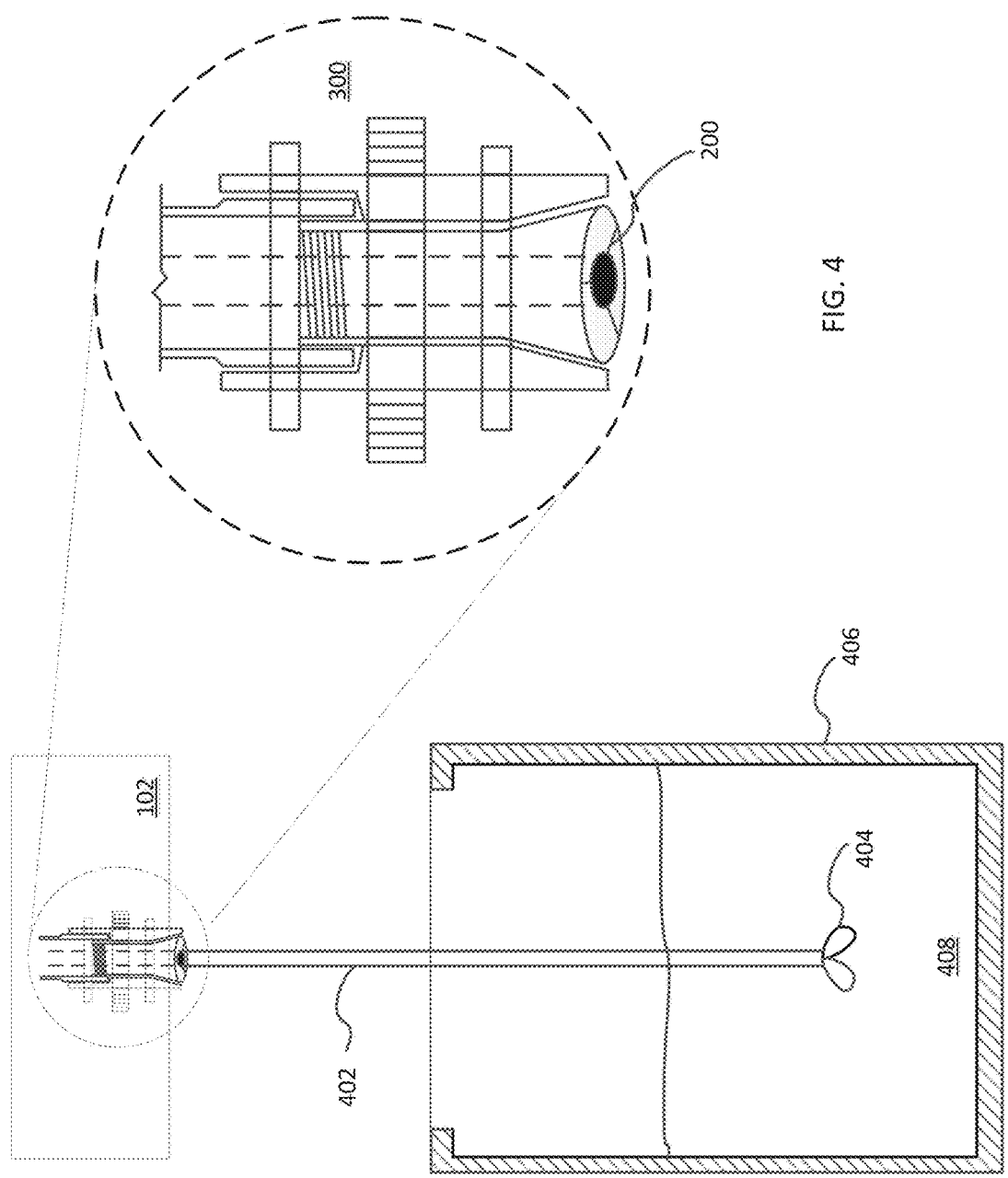
FIG. 4 illustrates an example embodiment of the retaining system of FIG. 3 in a gear motor mixer application in accordance with the present disclosure.

FIG. 4 illustrates an example implementation embodiment of shaft retaining system 300, including collet chuck 200, with gearmotor 102. As shown, a mixing shaft 402 with mixing blades 404 is retained within collet 200 of shaft retaining system 300. As shown, mixing blades 404 will mix liquids 408 (such as those that have solids that settle without agitation) within a stand mixer tank 406 (or alternatively as a drum mounted mixer).

From the foregoing it will be apparent that the present invention provides an adjustable collet chuck capable of effecting a universal attachment mechanism for various shaft sizes (e.g., 3/64 to 1⅛ inch or 3 to 26 mm), shapes (e.g., round, hexagonal or square) and lengths, and one characterized by its ease of adjustment and by the simplicity and economy of its parts. Non-limiting examples of collet features include, but are not limited thereto: round, hexagonal and non-symmetric shapes; various threading pitches and opening sizes (for receiving various shaft sizes (e.g., known common shafts, specific customized shafts, etc.).

Example use of the embodiments disclosed herein includes hollow or solid shaft connections. One or more benefits of the present disclosure include, but are not limited to, attachment of multiple diameter shafts using a single universal connector, selection from 100's of unique sizes for the 5C collet, in imperial and metric sizes, from OEM designated tooling or from multiple distribution channels, connection/disconnection of a shaft at different positions, such as on a stand mixer with a shaft/propeller assembly, etc.

While one or more particular gearmotors are described herein, other known or future configurations can likewise be implemented that use one or more gearmotors not expressly shown, direct connectivity between elements, and/or indirect coupling between other elements as recognized by one of average skill in the art.

As may be used herein, the term(s) "collet" and "collet chuck" are considered interchangeable. As also may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, sizing, and/or attachment security. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element and/or a module). As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items provides a desired relationship. For example, when the desired relationship is that a measurement metric 1 has a greater magnitude than measurement metric 2, a favorable comparison may be achieved when the magnitude of a measurement metric value 1 is greater than that of value 2 or when the magnitude of a measurement metric value 2 is less than that of value 1.

As may also be used herein, the terms "module", "connection module" "connector", and/or "connection unit" may be a single connecting device or a plurality of connecting parts. Note that if the module, connection module, connector, and/or connection unit includes more than one connection part, the connection of parts may be directly coupled together via a threaded, compressive or welded structure. Such a connection device can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed.

One of average skill in the art will also recognize that the functional building blocks, and other illustrative blocks, modules and components herein, can be implemented as illustrated or by discrete components, and the like or any combination thereof.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A universal driven shaft retaining system comprises:
    a collet chuck holder, the collet chuck holder including an inner central cylindrical body portion that circumferentially engages a frustoconical collet chuck with substantially inward compression during inward co-linear movement;
    a plurality of threads, on an external proximal end of the frustoconical collet chuck, radially engaging mating internal threads of a hollow drawing bar, the hollow drawing bar engaging the frustoconical collet chuck at a radial position between the collet chuck holder and the frustoconical collet chuck;
    a hexagonal lock nut encompassing at least a portion of the hollow drawing bar proximate to the collet chuck holder and providing the inward co-linear movement during rotation in conjunction with an abutment force to a proximal end of the collet chuck holder;
    one or more ball bearings encompassing at least a portion of the collet chuck holder and providing radial alignment of the collet chuck holder, the frustoconical collet chuck and the hollow drawing bar; and
    a gear encompassing at least a portion of the collet chuck holder and in operative engagement with the collet chuck holder providing a geared surface for mechanical rotation of a shaft, received within the frustoconical collet chuck, by one or more gears of a gearmotor.

2. The universal driven shaft retaining system as per claim 1, wherein the shaft is any of: hollow, solid or a hybrid shaft.

3. The universal driven shaft retaining system as per claim 1, wherein the inward compression locks the shaft to a drive mechanism of the gearmotor.

4. The universal driven shaft retaining system as per claim 1, wherein the shaft is selected from a set of shafts of various diameters.

5. The universal driven shaft retaining system as per claim 1, wherein the shaft is selected from a set of shafts of various lengths.

6. The universal driven shaft retaining system as per claim 1, wherein the shaft is selected from a set of shafts of various cross-sections.

7. The universal driven shaft retaining system as per claim 1, wherein the collet chuck holder comprises a 5C collet.

8. The universal driven shaft retaining system as per claim 1, wherein the frustoconical collet chuck receives hexagonal or square shafts.

9. The universal driven shaft retaining system as per claim 1, wherein the shaft includes a mixing shaft.

10. A gearmotor comprises:
    a universal driven shaft retaining system comprising:
    a collet chuck holder operative with a gearmotor, the collet chuck holder receiving a frustoconical collet chuck and hollow drawing bar, the hollow drawing bar engaging the frustoconical collet chuck at a radial position between the collet chuck holder and the frustoconical collet chuck;
    a collet chuck holder opening for receiving a driven shaft along a central axis of the collet chuck holder;
    a hexagonal lock nut encompassing at least a portion of the hollow drawing bar proximate to the collet chuck holder and providing an inward co-linear movement during rotation in conjunction with an abutment force to a proximal end of the collet chuck holder; and
    wherein the collet chuck holder circumferentially engages the collet chuck within the collet chuck holder to provide substantially inward compression during the inward co-linear movement of the drawing bar to create a clamping effect on an inserted driven shaft.

11. The gearmotor as per claim 10, wherein the inserted driven shaft is selected from a set of driven shafts of various: diameters, lengths, or cross-sections.

12. A universal driven shaft retaining system comprises:
    a collet chuck holder, the collet chuck holder including a central cylindrical body portion that circumferentially engages a frustoconical collet chuck with substantially inward compression during inward co-linear movement;
    a plurality of threads, on an external proximal end of the frustoconical collet chuck, radially engaging mating internal threads of a hollow drawing bar, the hollow drawing bar engaging the frustoconical collet chuck at a radial position between the collet chuck holder and the frustoconical collet chuck, and wherein the frustoconical collet chuck further includes at last a groove rotationally fixing the frustoconical collet chuck when engaging at least a portion of the collet chuck holder;
    a hexagonal lock nut encompassing at least a portion of the hollow drawing bar proximate to the collet chuck holder and providing the inward co-linear movement during rotation in conjunction with an abutment force to a proximal end of the collet chuck holder;
    one or more ball bearings encompassing at least a portion of the collet chuck holder and providing radial alignment of the collet chuck holder, the frustoconical collet chuck and the hollow drawing bar; and
    a gear encompassing at least a portion of the collet chuck holder and in operative engagement with the collet chuck holder providing a geared surface for mechanical rotation of a shaft, received within the frustoconical collet chuck, by one or more gears of a gearmotor.

* * * * *